US012767617B2

(12) United States Patent
Boxley et al.

(10) Patent No.: US 12,767,617 B2
(45) Date of Patent: Oct. 20, 2026

(54) GREEN METHODS OF CARBOHYDRATE ACETYLATION

(71) Applicant: GlycoSurf, Inc., Salt Lake City, UT (US)

(72) Inventors: Chett Boxley, Park City, UT (US); Ryan Stolley, Salt Lake City, UT (US); Robert Bruggeman, Salt Lake City, UT (US)

(73) Assignee: GlycoSurf, Inc., Salt Lake City, UT (US)

(*) Notice: Subject to any disclaimer, the term of this patent is extended or adjusted under 35 U.S.C. 154(b) by 963 days.

(21) Appl. No.: 17/964,867

(22) Filed: Oct. 12, 2022

(65) Prior Publication Data

US 2023/0132332 A1 Apr. 27, 2023

Related U.S. Application Data

(60) Provisional application No. 63/322,552, filed on Mar. 22, 2022, provisional application No. 63/255,008, filed on Oct. 13, 2021.

(51) Int. Cl.

| | |
|---|---|
| ***C07B 41/12*** | (2006.01) |
| ***B01J 31/02*** | (2006.01) |
| ***C08J 11/08*** | (2006.01) |

(52) U.S. Cl.

CPC ........... *C07B 41/12* (2013.01); *B01J 31/0244* (2013.01); *C08J 11/08* (2013.01); *C08J 2439/08* (2013.01)

(58) Field of Classification Search

USPC ........................................................ 536/18.6

See application file for complete search history.

(56) References Cited

U.S. PATENT DOCUMENTS 11,547,719 B2 * 1/2023 Park ........................ A61P 31/04

OTHER PUBLICATIONS

Pace et al., ChemSusChem, 2012, vol. 5, pp. 1369-1379. (Year: 2012).*

Abbott et al., "O-Acetylation of cellulose and monosaccharides using a zinc based ionic liquid," Green Chem., 2005, 7, pp. 705-707.

Anastas et al., "Green Chemistry: Theory and Practice," Chapter 4: Principles of Green Chemistry, Oxford University Press: New York, 1998, p. 30.

Bartoli et al., "Per-O-acetylation of sugars catalyzed by Ce(Otf)3," Green Chem., 2004, 6, pp. 191-192.

Bizier et al., "Indium triflate catalyzed peracetylation of carbohydrates," Carbohydr Res., 2008, 343(10-11): 1814-1818.

Borah et al., "Synthesis, characterization and application of poly (4-vinylpyridine)-supported Brønsted acid as reusable catalyst for acetylation reaction," Bull. Korean. Chem. Soc., 2011, 32(1): 225-228.

Car et al., "Enzymic hydrolysis of acetylated D-ribose derivatives," Croatica Chemica ACTA, 2007, 80, pp. 599-603.

Compton et al., "Optimization of a Chemical Synthesis for Single-Chain Rhamnolipids," ACS Sustainable Chem. Eng., 2020, 8, 8918-8927.

Durette et al., "Conformational studies on pyranoid sugar derivatives. The Conformational equilibria of the D-aldopentopyranose tetraacetates and tetrabenzoates," J. Org. Chem., 1971, 36(18): 2658-2669.

Englezou et al., "2-Methyltetrahydrofuran (2-MeTHF) as a versatile green solvent for the synthesis of amphiphilic copolymers via ROP, FRP, and RAFT tandem polymerizations," Journal of Polymer Science, 2020, 58, 24 pages.

Feast et al. "The search for new amphiphiles: synthesis of a modular, high-throughput library," Beilstein J. Org. Chem., 2014, 10, pp. 1578-1588.

Giri et al., "Diazepinium perchlorate: a neutral catalyst for mild, solvent-free acetylation of carbohydrates and other substances," RSC Adv., 2017, 7, pp. 13653-13667.

Henderson et al., "Carbohydrates as enantioinduction components in stereoselective catalysts," Org. Biomol. Chem., 2016, 14, pp. 4008-4017.

Herde et al., "Stereoselective acetylation of hemicellulosic C5-sugars," Carbohydr. Res., 2017, 443-444: 1-14.

Hudson et al., "The Isomeric Tetracetates of Xylose, and Observations Regarding the Acetates of Melibiose, Trehalose and Sucrose," Journal of the American Chemical Society, 1915, 37, pp. 2748-2753.

Jansson et al., "2-(Trimethylsilyl)ethyl glycosides. Synthesis, anomeric deblocking, and transformation into 1,2-trans 1- O-acyl sugars," J. Org. Chem., 1988, 53, pp. 5629-5647.

Kawai et al., "Biofuel production based on carbohydrates from both brown and red macroalgae: Recent developments in key biotechnologies," Int. J. Mol. Sci., 2016, 17, 145.

Khaligh et al., "Preparation, characterization and use of poly(4-vinylpyridinium) perchlorate as a new, efficient, and versatile solid phase catalyst for acetylation of alcohols, phenols and amines," Journal of Molecular Catalysis A: Chemical, 2012, (363-364): 90-100.

Kim et al., "Synthesis of glycosyl fluorides by photochemical fluorination with sulfur (VI) hexafluoride," Org. Lett., 2021, 23, pp. 190-194.

Leaback et al., "Preparation and properties of crystalline acetochlorofucose and its conversion into the B-glycosides and a-1-phosphate of L-fucose," Biochemistry, 1969, 8(4): 1351-1359.

Lichtenthaler, "Carbohydrates as Organic Raw Materials," Ullman's Encyclopedia of Industrial Chemistry, 2010, pp. 583-616.

Lu et al., "Simple and efficient per-O-acetylation of carbohydrates by lithium perchlorate catalyst," Tetrahedron, 2004, 60, pp. 8967-8973.

(Continued)

*Primary Examiner* — Traviss C McIntosh, III

(74) *Attorney, Agent, or Firm* — Michael Best & Friedrich LLP

(57) ABSTRACT

Methods of carbohydrate acetylation are disclosed. A method may include adding a carbohydrate to a reaction vessel, adding poly(4-vinylpyridine) (P4VP) to the reaction vessel, adding a bio-derived solvent to the reaction vessel, adding acetic anhydride (Ac2O) to the reaction vessel, and adding a catalyst to the reaction vessel. The bio-derived solvent may be 2-methyltetrahydrofuran (2-MeTHF). A catalyst may also be added to the reaction vessel.

6 Claims, 4 Drawing Sheets

(56) References Cited

OTHER PUBLICATIONS

Lugemwa et al., "Facile and efficient acetylation of primary alcohols and phenols with acetic anhydride catalyzed by dried sodium bicarbonate," Catalysts, 2013, 3, pp. 954-965.
Lv et al., "Regioselective sulfonylation/acylation of carbohydrates catalyzed by FeCl3 combined with benzoyltrifluoroacetone and its mechanism study," J. Org. Chem., 2020, 85, pp. 3307-3319.
Mukhopadhyay et al., "Streamlined Synthesis of Per-O-acetylated Sugars, Glycosol lodides, or Thioglycosides from Unprotected Reducing Sugars," Acs J. Org. Chem., 2004, 69, pp. 7758-7760.
Nicholas et al., "Acetylation of Sugars," Nature, 1948, 161: 349.
Nóbrega et al., "Conformational Study of the Hydroxymethyl Group in a-D-mannose Derivatives," Tetrahedron: Asymmetry, 2003, 14, pp. 2793-2801.
Rudnicki et al., "Lagrangian molecular dynamics using selected conformational degrees of freedom, with application to the pseudorotation dynamics of furanose rings," Biopolymers, 1994, 34(3): 383-392.
Schnaar, "Complex Carbohydrates in Drug Development," Adv Pharmacol, 2008, 23: 35-84.
Sears et al., "Intervention of carbohydrate recognition by proteins and nucleic acids," Proc. Natl. Acad. Sci. USA, 1996, 93, p. 12086-12093.
Velter et al., "Carbohydrate-based molecular scaffolding," Journal of Carbohydrate Chemistry, 2006, 25, pp. 97-138.
Ware et al., "Alkylpolyglycoside: carbohydrate based surfactant," Journal of Dispersion Science and Technology, 2007, 28(3): 437-444.
Werz et al., "Carbohydrates as the next frontier in pharmaceutical research," Chem. Eur. J., 2005, 11, pp. 3194-3206.
Yu et al., "Development of Surfactants and Builders in Detergent Formulations," Chinese Journ. of Chem. Engin, 2008, 16: 517-527.

* cited by examiner

GREEN METHODS OF CARBOHYDRATE ACETYLATION

CROSS-REFERENCE TO RELATED APPLICATIONS

This application claims the priority benefit of U.S. Provisional Application No. 63/255,008, filed Oct. 13, 2021, which is incorporated herein by reference in its entirety. This application also claims the priority benefit of U.S. Provisional Application No. 63/322,552, filed Mar. 22, 2022, which is also incorporated herein by reference in its entirety.

STATEMENT REGARDING FEDERALLY FUNDED RESEARCH

This invention was made with government support under Grant No. DE-SC0021702 awarded by the Department of Energy, Office of Science. The government has certain rights in the invention.

TECHNICAL FIELD

The application relates generally to the acetylation of carbohydrates, and more specifically, to methods of carbohydrate acetylation using a recyclable base material and bio-renewable solvents yielding similar outputs to less green methods.

BACKGROUND

Carbohydrates have many important uses in the chemical industry. Carbohydrates can be incorporated directly or derivatized and used in myriad applications such as chiral building blocks, biofuels, pharmaceuticals, and surfactants, to name but a few. These molecules are abundant in nature, readily biodegradable, and thus provide a sustainable and environmentally friendly alternative to petrol-chemical al based products and processes. However, in chemical processing and derivatization of carbohydrates, the molecules are often protected by various means to achieve the desired stereo- and chemo-selectivity. One of the most common methods of protecting carbohydrates is through the per-O-acetylation of the various hydroxy groups of the carbohydrate. The most common per-O-acetylation procedures for carbohydrates such as pentose, hexose, and polysaccharides involve the use of a stoichiometric base such as pyridine. However, pyridine is toxic, extremely environmentally hazardous, malodorous, and can be difficult to remove due to its high boiling point. It also requires special disposal. Residual pyridine can also cause downstream processing problems for post acetylation uses. For example, the pyridine residue causes problems with processes such as Lewis-acid mediated glycosylation procedures. Furthermore, the problems with left over or residual pyridine are compounded with scaling the acetylation process.

Acetylation processes known in the art are also problematic because they use halogenated and non-renewable solvents such as methylene chloride, tetrahydrofuran, acetonitrile, dimethylformamide, and triethylamine, just to name a few. This usage can lead to additional negative human and environmental impacts. Many methods requiring the aforementioned toxic solvents can create a crude product that requires additional processes steps that add to processing costs.

One attempt to overcome the negative results of toxic bases or non-renewable solvents included the use of catalytic iodine. However, this method requires extra processing to remove or substitute iodine, which adds undesired cost and time expenses. This proposed solution is also not feasible to scale. Other attempts to overcome current problems include using certain base or acid catalysts such as $Ce(OTf)_3$, lithium perchlorate, zinc chloride, among many others. However, these catalysts also tend to be toxic, environmentally harmful, or expensive.

Other drawbacks of known acetylation methods are that they often require the transfer of reactants and/or byproducts between various reaction vessels during the process. This is inefficient and increases manpower cleaning and equipment costs.

What is needed, therefore, is an acetylation process that uses a non-toxic renewable base. It would be an advancement in the art to also have a process that uses bio-derived solvents. It would yet be an advancement if the process was doable in a single reaction vessel. It would further be an advancement to be able to accomplish similar yields to prior art processes that did not have the forgoing green metrics. Finally, it would be an advancement if such a process were scalable. Such a process is described and claimed herein.

SUMMARY

Embodiments are disclosed herein regarding the acetylation of carbohydrates. The acetylation procedures may adhere to many important green metrics through reducing waste, using bio-derived/benign solvents and reagents, and using renewable feedstocks. In one embodiment, increasing acetylation sustainability allowed for quantitative yields commensurate with previous acylation methods.

The methods described allows for acetylation of carbohydrates using green metrics. In one embodiment, a method of carbohydrate acetylation, includes adding a carbohydrate, a polymer base material, a solvent, 4-dimethylaminopyridine (DMAP), and acetic anhydride (Ac2O) together. In one embodiment, they are added together in a single reaction vessel. The polymer material may be poly(4-vinylpyridine) (P4VP). Using a polymer material base allows for the recycling of the base, which can be filtered out and reused after the acetylation process. In contrast, the more toxic pyridine base used in prior art processes is typically liquid which is more difficult to recover, even if it were desirable to do so. Accordingly, the acetylation methods of embodiments described herein are greener than current methods using different processes.

The solvent, in one embodiment, is a bio-derived solvent that comes from a sustainable source. This also adds a green metric not found in the prior art. In certain embodiments, the acetylation process may include the use of a catalyst to facilitate a more efficient process. The catalyst may be impregnated with the bio-derived solvent to foster a more efficient reaction. In other embodiments, a catalyst in not used.

In one embodiment, acetylation methods of the present invention yielded anomeric ratios of less than 10:1. In other embodiments, the acetylation method yielded anomeric ratios of less than or equal to 3:2. In certain embodiments, the invention Acetylation method embodiments of the present invention yield a percentage of carbohydrates with an acetyl functional group that is comparable to methods that don't use recyclable and sustainable reactants.

Embodiments of the acetylation method are configured to be scalable.

DETAILED DESCRIPTION

Figure 1:
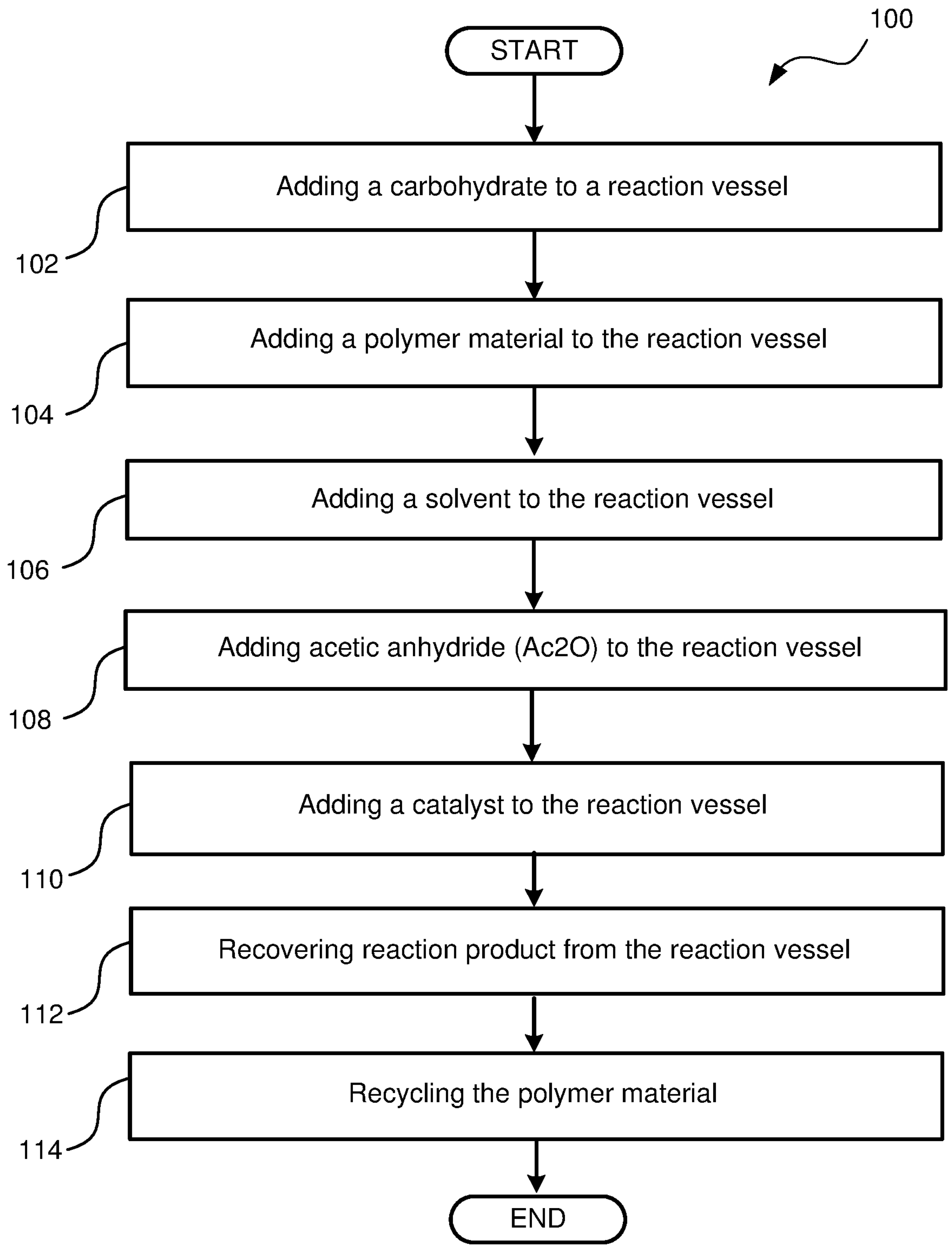
FIG. 1 is a flowchart showing an embodiment of an acetylation method.

In the following detailed description, reference is made to the accompanying drawings which form a part hereof, and in which is illustrated specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. For example, the detailed description includes various embodiments of the compositions and methods of the present invention. These embodiments are described in sufficient detail to enable those of ordinary skill in the art to practice the disclosure. However, before the present materials and methods are described, it is to be understood that this invention is not limited to the particular molecules, compositions, reactants, methodologies, or protocols herein described, as these may vary in accordance with routine experimentation and optimization. It is also to be understood that the terminology used in the description is for the purpose of describing the particular versions or embodiments only and is not intended to limit the scope of the embodiments described herein. Accordingly, various substitutions, modifications, additions rearrangements, or combinations thereof are within the scope of this disclosure. Furthermore, all or a portion of any embodiment disclosed herein may be utilized with all or a portion of any other embodiment, unless stated otherwise.

In accordance with common practice, the various features illustrated in the drawings may not be drawn to scale. The illustrations presented herein are not meant to be actual views of any particular composition, molecule, ingredient, or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given embodiment or all operations of a particular method. In addition, like reference numerals may be used to denote like features throughout the specification and figures. Furthermore, all or a portion of any embodiment disclosed herein may be utilized with all or a portion of any other embodiment, unless stated otherwise.

In addition, it is noted that the embodiments may be described in terms of a process that is depicted as method steps, a flowchart, a flow diagram, a schematic diagram, or a block diagram. Although a flowchart, process, or method may describe operational acts as a sequential process, many of these acts can be performed in another sequence, in parallel, or substantially concurrently. In addition, the order of the acts may be re-arranged. A process may correspond to a method, a function, a procedure, a routine, a program, and the like.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in this disclosure should not be interpreted as excluding the embodiments of the disclosure. Additional term usage is described below to assist the reader in understanding the disclosure.

The terms "have," "may have," "include," and "may include" as used herein indicate the presence of corresponding features (for example, elements such as numerical values, functions, operations, or ingredient), and do not preclude the presence of additional features.

The word "exemplary" is used herein to mean "serving as an example or illustration." Any aspect or design described herein as "exemplary" is not necessarily to be construed as preferred or advantageous over other aspects or designs.

The terms "A or B," "at least one of A and B," "one or more of A and B", or "A and/or B" as used herein include all possible combinations of items enumerated with them. For example, use of these terms, with A and B representing different items, means: (1) including at least one A; (2) including at least one B; or (3) including both at least one A and at least one B. In addition, the articles "a" and "an" as used herein should generally be construed to mean "one or more" unless specified otherwise or clear from the context to be directed to a singular form.

Terms such as "first," "second," and so forth are used herein to distinguish one component from another without limiting the components and do not necessarily reflect importance, quantity, or an order of use. For example, a first washing and a second washing may indicate different washings regardless of the order or importance. Furthermore, a reference to first and second elements does not mean that only two elements may be employed there or that the first element must precede the second element in some manner. Also, unless stated otherwise a set of elements may comprise one or more elements.

The section headings provided herein are for convenience only do not interpret the scope or meaning of the claimed options. Furthermore, unless otherwise defined, all technical and scientific terms used herein have the same meaning as commonly understood by one of ordinary skill in the art to which this invention belongs. However, in case of conflict, the present specification, including definitions, will control. Accordingly, in the context of the embodiments described herein, the following definitions apply.

As used herein and in the appended claims, the singular forms "a", "an" and "the" include plural reference unless the context clearly dictates otherwise.

The expression "configured to" as used herein may be used interchangeably with "suitable for," "having the capacity to," "designed to," "adapted to," "made to," or "capable of" according to a context. The term "configured" does not necessarily mean "specifically designed to," and the expression compound or composition "configured to . . . " may mean that the compound or composition is "capable of . . . " along with other compounds or compositions in a certain context.

Unless the context otherwise requires, in the description text and in the claims that follow, the term "contain" and its derivatives, such as "contains" and "containing," should be considered open, non-restrictive forms, that k, as "including but not limiting." in addition, the terms "having," or "including" should be understood as "including but not limited to the specific member or members listed.

The term "about," as used herein, includes any value that is within 10% of the described value.

The term "between," as used herein, is inclusive of the lower and upper number of the range.

Reference herein to any numerical range (for example, a dosage range) expressly includes each numerical value (including fractional numbers and whole numbers) encompassed by that range. For example, but without limitation, reference herein to a range of 13° C. to 33° C. explicitly includes all whole numbers and fractional numbers between the two.

The terms "formula" and "molecule" may be used interchangeably in certain contexts.

The term "bio-derived," when used as an adjective to something, refers to something that can be derived, obtained, and/or synthesized from living or once-living organisms. "Bio-derived" things include, without limitation, materials, chemicals and/or energy derived from renewable biological resources.

The term "reaction vessel" means any vessel suitable for the reactions described herein throughout and/or containing the reactants and end products described herein. "Reaction vessels" may include without limitation, a beaker, a tub, a flask, a crucible, a tube, to name a few. "Reaction vessels may be made of metal, glass, ceramic and/or other suitable materials.

Turning now to FIG. 1, a method 100 of carbohydrate acetylation, includes adding a carbohydrate 102 to a reaction vessel. In one embodiment, the carbohydrate is a sugar. The sugar may be a monosacdchardie or polysaccharide. For example, the sugar may be one or more of allose, altrose, arabinose, fructose, fucose, galactose, glucose, gulose, idose, xylose, psicose, rhamnose, ribose, 2-deoxy-ribose, ribulose, sorbose, tagatose, talose, xylose, xylulose, chitobiose, dirhamnose, gentiobiose, isomaltose, isomaltulose, lactose, lactulose, laminaribose, leucrose, maltose, maltulose, melibiose, nigerose, sophorose, sucrose, trehalose, turanose, xylobiose, cellotriose, isomaltotriose, isopanose, laminaritriose, manninotriose, maltotriose, melezitose, nigerotriose, panose, raffinose, xylotriose, either alone or in combination with other sugars or carbohydrates.

The method 100 includes adding a polymer material 104 to the reaction vessel. The polymer material 104 may be a polymer base. In one embodiment, the polymer material is poly(4-vinylpyridine). The polymer material may be added in stoichiometric amounts. The method 100 includes adding a solvent 106 to the reaction vessel. The solvent may be bio-derived. In one embodiment, the bio-derived solvent includes 2-methyltetrahydrofuran (2-MeTHF). The method 100 includes adding acetic anhydride (Ac2O) 108 to the reaction vessel. In certain embodiments, the acetic anhydride comprises adding Ac2O in stoichiometric amounts.

In certain embodiments, co-solvents that are also bio-derived may be used to increase the solubility of a carbohydrate, including without limitation, glucose, galactose, and lactose in the first solvent 2-MeTHF. The procedures may also include regeneration screening of P4VP using SEM techniques to study the morphology of the polymer to achieve optimal regeneration conditions and therefor recyclability properties of the polymer. Recycled materials may be used, including, by way of nonlimiting example, using regenerated P4VP for each carbohydrate listed in Table 3, and in certain procedure embodiments, iterations of certain steps may use the same or renewed materials. For example, the procedure may use step iterations where the same regenerated and/or recycled P4VP may be used per reaction.

The acetylation may occur in continuous or batch reactions. In one embodiment, the batch size may be greater than about 100 g. In other embodiments, a batch size less than or equal to 1 Kg may be used. Batches may include xylose and/or other carbohydrates using virgin and regenerated P4VP. Bio-derived co-solvents may be used to increase solubility of glucose, galactose, and lactose in 2-MeTHF. The acetylation may occur in multiple reaction vessels. In one embodiment, one reaction vessel is used.

The method 100 may include recovering reaction product 112 from the reaction vessel. Recovering the reaction product 112 may be accomplished by any of a number of ways known in the art.

The method 100 may include recovering the polymer material 114. The P4VP may be recovered 114 filtration. In one embodiment, the polymer material may be washed as part of the recovery step 114 to remove acetylated product. In one embodiment, the polymer material is washed a with 3×3 mL/g methanol. The washed polymer material may be regenerated and reused in further acetylation processing.

Figure 2:
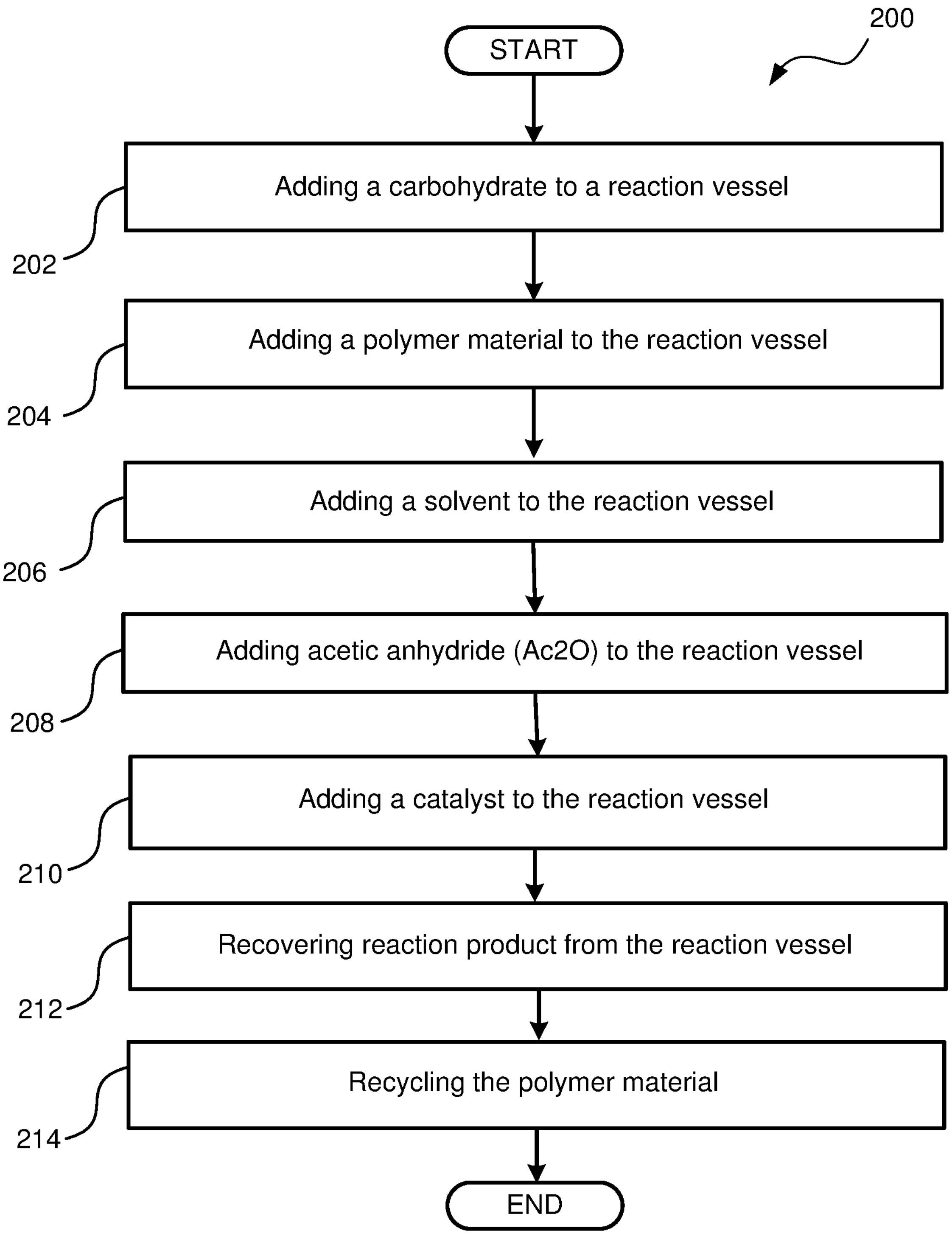
FIG. 2 is a flowchart showing another embodiment of an acetylation method.

Turning now to FIG. 2, another embodiment of an acetylation method is shown. In this embodiment, a method 200 may include adding a carbohydrate 202, adding a polymer material 204, adding a solvent 206, and adding acetic anhydride (Ac2O) 208 to a reaction vessel as described above.

In the embodiment, a catalyst may be added 210 to the reaction vessel at various steps of the method 200. In one embodiment, the catalyst includes 4-dimethylaminopyridine (DMAP). In one embodiment, adding solvent 206 comprises adding a catalyst impregnated with the bio-derived solvent.

As discussed above, the method 200 may include recovering reaction product 212 from the reaction vessel and recovering the polymer material 214.

The method and/or method steps are configured to be scalable to up ten times the yields. In one embodiment, the method steps described herein are configured to be scalable up to one hundred times the yields of the original method steps.

Figure 3:
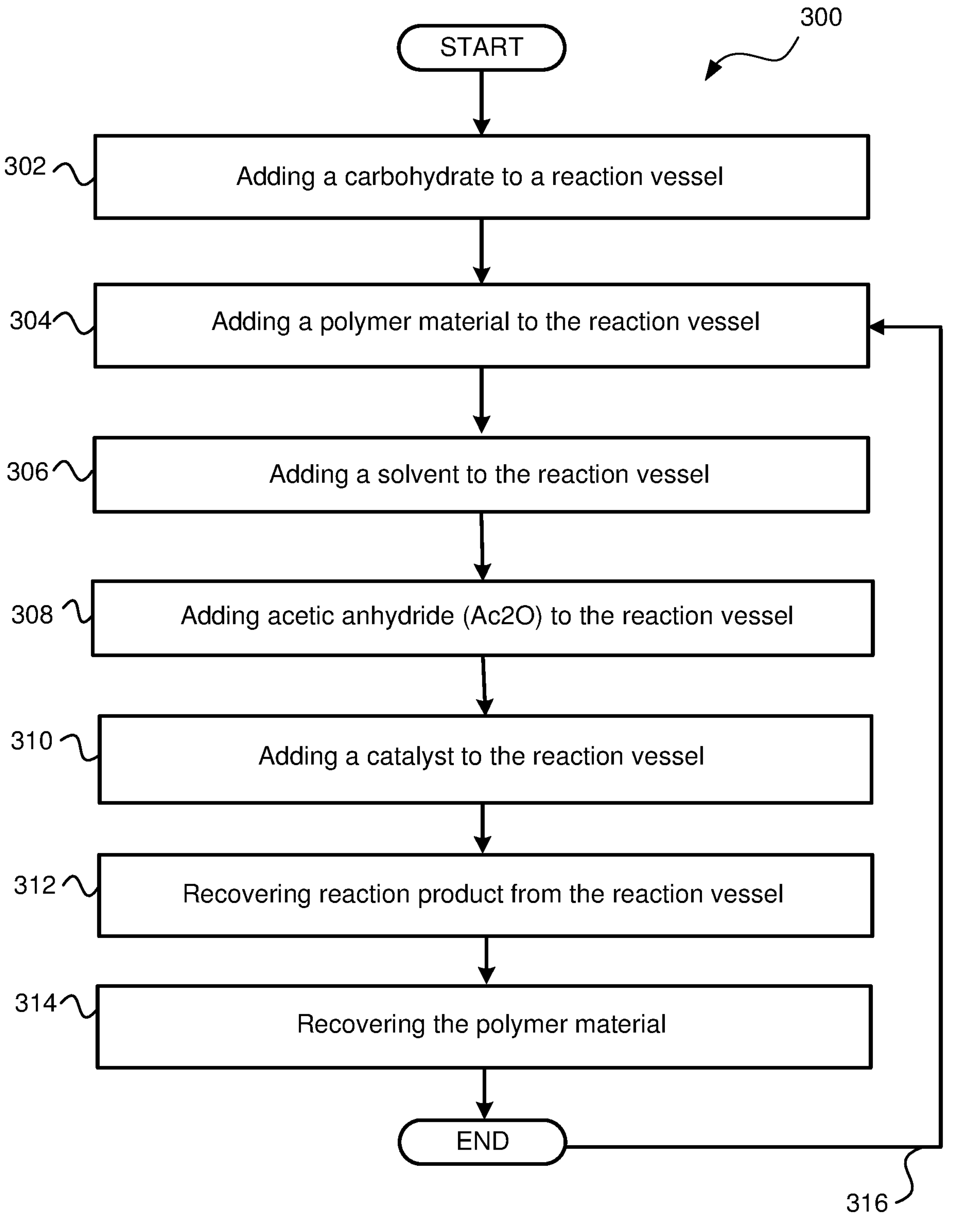
FIG. 3 is a flowchart showing another embodiment of an acetylation method.

Turning now to FIG. 3, another method 300 of acetylation of a carbohydrate is shown. This embodiment may include steps similar to those described in FIGS. 1 and 2. In this embodiment, the polymer material recovered from step 314 may be used as the polymer material added in step 304 as a recycling step 316. This recycling step may be used in any of the embodiments described herein.

Experimental Overview

Embodiments of the methods described herein were tested using various carbohydrates. By way of non-limiting general example, rhamnose was per-O-acetylated using stoichiometric amounts of P4VP and acetic anhydride in the presence of catalytic amounts of 4-dimethylaminopyridine (DMAP) using various solvents. Rhamnose was also per-O-acetylated using stoichiometric amounts of P4VP and acetic anhydride using various solvents. In other embodiments, sugars were acetylated without a catalyst. A basic equation of one testing procedure is shown below:

(1)

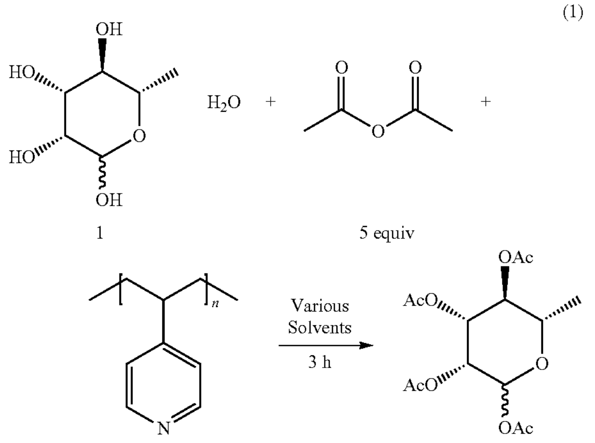

1

1α: X = α-OAc
1β: X = β-OAc

After initial acetylation of certain sugars, xylose was used to test the recyclability of P4VP over 10 iterations. The method was then applied to various carbohydrates using the bio derived solvent, 2-methyltetrahydrofuran (2-MeTHF). The carbohydrates were analyzed for reaction yields, isomeric ratios, and purity. The scalability of these reactions were also tested. The acetylations of each saccharide produced quantitative yields that were analysed for purity and anomeric ratios. Embodiments of the methods described herein were shown to be highly selective, scalable, and the P4VP recyclable.

Initial Solvent Screening

Initial screening utilized L-rhamnose monohydrate, due in part to its increased solubility in organic solvents. P4VP (5 eq, 6.1 mmol) was subjected to wet impregnation from the solvents listed in Table 1 below at 0.3M followed by the addition of (1 eq, 0.610 mmol), both in the presence and absence of DMAP (0.1 eq, 0.06 mmol) for each solvent. The concentration of the reaction could not be increased due to the viscosity of the resulting slurry upon mixing P4VP with solvent. The solution was stirred at room temperature (RT) for 10 minutes and $Ac_2O$ (5 eq, 6.1 mmol) and was added dropwise. The reaction was then stirred at RT for 3 hours.

TABLE 1

Solvent and catalyst screening of the acetylation of L-rhamnose[b]

| Entry | Solvent | Time (h) | DMAP (equiv.) | Conversion[c] |
|---|---|---|---|---|
| 1 | MeCN | 3 | none | trace |
| 2 | MeCN | 3 | 0.05 | poor |
| 3 | THF | 3 | none | trace |
| 4 | THF | 3 | 0.05 | high |
| 5 | $CH_2CL_2$ | 3 | none | poor |
| 6 | CH2CL2 | 3 | 0.05 | fair |
| 7 | PhH | 3 | none | trace |
| 8 | PhH | 3 | 0.05 | fair |

[a] Racelmic mixture of alpha and beta anomers
[b]Reactions run with 200 mg of rhamnose at 0.3M solvent, vigorous stirring required due to hetergenaity
[c]Determined qualitatively via TLC, visualized with p-anisaldehyde stain After stirring each reaction for 3 hours at RT, the P4VP was filtered and rinsed with ethyl acetate, and the filtrate subjected to aqueous workup (see supplemental information) and the resulting isolated colorless resins were tested qualitatively via TLC, due to the variable solvation of L-rhamnose in the various solvents. The screening demonstrated that THF in the presence of DMAP yielded the best results as shown in Table 1 where a conversion value of "high" translates to a quantitative yield. Furthermore, over the course of the acetylation with THF, the TLC plates showed the reactions as multiple spots that coalesced into a single spot upon completion which we believe is due to step-wise acetylation of L-rhamnose and the subsequent increase of solubility of the intermediate products. Having qualitative screening success, we then applied the method at ten times mmol scale to L-rhamnose monohydrate and D-xylose to measure reaction yields. The yields for the per-O-acetylation reactions of L-rhamnose monohydrate and D-xylose were 85.3% and 84.3%, respectively.

The tested saccharides have high solubilities in THF. However, the solubility of the acetylated saccharides in THF combined with the miscibility of THF in water created issues during the work up. In order to extract the acetylated saccharides, the THF had to be evaporated prior to work up followed by re-dissolving the acetylated saccharides in ethyl acetate leading to more time and waste. Furthermore, an additional washing step was required using ethyl acetate to capture the tetraacetylated rhamnose, xylose, and pentaacetylated galactose thereby increasing the reactions overall solvent waste. Better solvents were needed

Examples and Results

One structurally similar solvent to THF, without the toxicity and solubility problems, is 2-MeTHF. This bio-renewable solvent has green metrics and it is a non-polar a-protic. The non-polar characteristic of 2-MeTHF eliminated the need for its removal post-acetylation and for the need of the co-solvent ethyl acetate to capture the acetylated products. The solubility problems of prior art methods were remedied by utilization of the bio-renewable THF alternative, 2-MeTHF, which was soluble with the acetylated saccharides and immiscible with water thereby eliminating the need for additional workup procedure and higher throughput. This modified reaction scheme was applied to various saccharides and one disaccharide as shown below in equation (2).

(2)

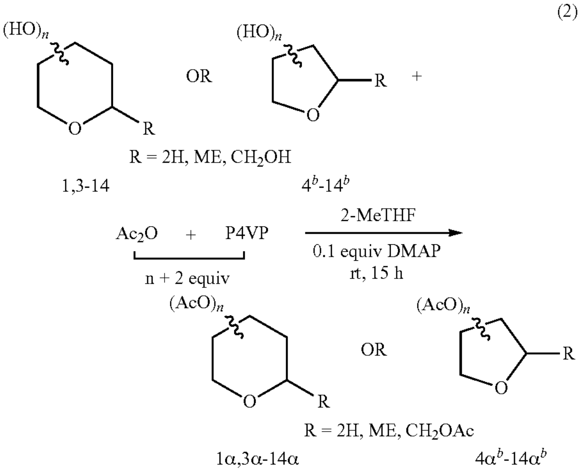

1,3-14 4[b]-14[b]

1α,3α-14α 4α[b]-14α[b]
1β,3β-14β 4β[b]-14β[b]

The amount of P4VP and $AC_2O$ used in each acetylation was equal to the amount of hydroxyl containing carbons plus 2 (n+2). In one embodiment, the tests were performed using various carbohydrates a one pot reaction. Quantitative yields were achieved for all peracetylated saccharides with the exception of galactose, glucose, and -lactose at RT. Various carbohydrates were acylated using 2-MeTHF and the reaction yields (%) and anomeric ratios (α:β) are shown in Table 2 below:

TABLE 2

The acetylation of various carbohydrates using 2-MeTHF as solvent.

| Entry | Carbohydrate | | Yield (%) | α:β |
|---|---|---|---|---|
| 1 | 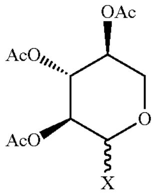 | peracetylated xylose<br>3α: X = α-OAc<br>3β: X = β-OAc<br>4α[b]: X = α-OAc<br>4β[b]: X = β-OAc | 96 | 9:1 (1:1)[b] |
| 2 | 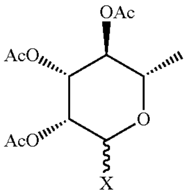 | peracetylated rhemnose<br>1α: X = α-OAc<br>1β: X = β-OAc | 96 | 43:7 |
| 3 | 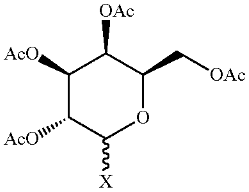 | peracetylated galactose<br>5α: X = α-OAc<br>5β: X = β-OAc | 15 (96)[a] | 1:1 |
| 4 | 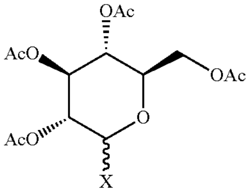 | peracetylated glucose<br>6α: X = α-OAc<br>6β: X = β-OAc | 71 (96)[a] | 3:2 |
| 5 | 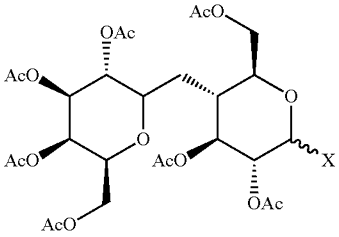 | peracetylated lactose<br>7α: X = α-OAc<br>7β: X = β-OAc | 37 (99)[a] | 1:1 |
| 6 | 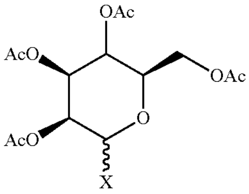 | peracetlyated mannose<br>8α: X = α-OAc<br>8β: X = β-OAc | 99 | 2:1 |
| 7 | 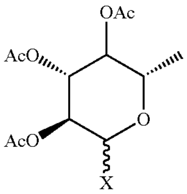 | peracetylated fucose<br>9α: X = α-OAc<br>9β: X = β-OAc | 99 | 9:1 |

TABLE 2-continued

The acetylation of various carbohydrates using 2-MeTHF as solvent.

| Entry | Carbohydrate | | Yield (%) | α:β |
|---|---|---|---|---|
| 8 | 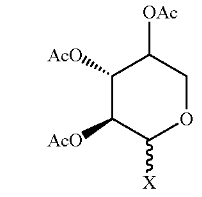 | peracetylated arabinose<br>10α: X = α-OAc<br>10β: X = β-OAc<br>11α[b]: X = α-OAc<br>11β[b]: X = β-OAc | 99 | 4:1 (1:1)[b] |
| 9 | 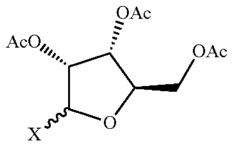 | peracetylated ribose<br>12α: X = α-OAc<br>12β: X = β-OAc<br>13α[b]: X = α-OAc<br>13β[b]: X = β-OAc | 98 | 1:2 (87:13)[b] |
| 10 | 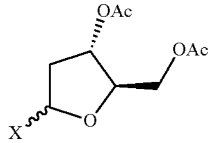 | peracetylated 2-deoxy-ribose<br>14α: X = α-OAc<br>14β: X = β-OAc | 99 | 3:2 |

[a]Reaction carried out at 60° C.
[b]Furanose form

Quantitative yields were achieved for all saccharides with the exception of pentaacetylated galactose, glucose, and octaacetylated lactose at RT. The low yielding saccharides were suspected to have solubility issues in 2-MeTHF and the reaction temperature was increased to 60° C. This allowed for quantitative yields in the per-O-acetylation of 5α/5β, 6α/6β, and 7α/7β in anomeric ratios of 1:1, 3:2, and 1:1, respectively for galactose, glucose, and lactose, with high purity and quantitative yields as determined by $^{1}$H NMR that was in agreement with literature values, as shown in table 3 below.

| Carbohydrate | Trial 2 Isolated Yield (%) | Trial 2 Isolated Yield (%) | Trial 2 Isolated Yield (%) | Average (%) | Standard Deviation (%) |
|---|---|---|---|---|---|
| Lactose | 99.29 | 99.29 | 97.29 | 98.6 | 1.2 |
| Glucose | 93.08 | 99.08 | 94.93 | 96 | 3.0 |
| Galactose | 95.24 | 97.235 | 96.774 | 96.4 | 1.0 |

The reaction time of 15 hours was not necessary to achieve complete acetylation for all ten saccharides. The C5 saccharides and mannose fully acetylated in less than 4 hours, but glucose, galactose, and lactose took much longer for full acetylation and were allowed to react overnight. It was determined that 15 hours allowed for full per-O-acetylation of the glucose, galactose and lactose and was therefore used as the standard reaction time. Furthermore, it is important to mention that tetraacetylated xylose, tetraacetylated arabinose, and tetraacetylated ribose all exist in both pyranose and furanose forms. The $^{1}$H NMR characterization of these saccharides revealed that tetraacetylated xylopyranoses 3α/3β and tetraacetylated xylofuranoses 4α/4β were present in a ratio of 95:5. The $^{1}$H NMR spectra was in agreement with literature values for stereoisomers and anomers of per-O-acetylated xylose. Tetraaceytlated arabinopyranoses 10α/10β and arabinofuranoses 11α/11β were present in a ratio of 37:13 which was similar to literature values[11]. Tetraacetylated pyranoses 12α/12β and tetraacetylated furanoses 13α/13β were present in a ratio of 87:13. This result was interesting as the pyranose form became even more prevalent post acetylation than the average stereoisomerism of 75:25-80:20.[26-28] This preliminary data suggests that the pyranose form of tetraacetylated ribose is more preferred than the furanose tetraacetylated ribose using this acetylation method. All other per-O-acetylated saccharides, 1α/1β[22], 8α/8β, 9α/9β and 14α/14β were isolated in high purity and the spectra were agreement with literature values. Following successful per-O-acetylation of various saccharides the method was scaled.

The results of additional carbohydrate acetylation trials under similar conditions are shown in Table 4 below.

TABLE 4

The acylation of various carbohydrates using 2-MeTHF as solvent, along with the total reaction time (h), yields (%), and anomeric ratio (α:β).

| Carbohydrate | Time (h) | Isolated Yield (%) | α:β |
|---|---|---|---|
| Glucose (α, β) | 15 | 71 | 95:5 |
| Galactose(α, β) | 15 | 15 | 95:5 |
| Mannose(α, β) | 15 | 99 | 9:1 |
| Rhamnose(α, β) | 15 | 96 | 86:14 |
| Xylose(α, β) | 15 | 96 | 9:1 |
| Arabinose(α, β) | 15 | 99 | 77:23 |
| Ribose(α, β) | 15 | 98 | 79:21 |
| 2-deoxy-ribose(α, β) | 15 | 99 | 46:54 |
| Fucose(α, β) | 15 | 99 | 88:12 |
| Lactose | 15 | 37 | ND |

Using this solvent, it was possible to reduce waste through eliminating ethyl acetate rinses to extract our acylated product, as 2-MeTHF is non-polar.

A scale up study was conducted using xylose at 10 times the mass (10.04 g), which resulted in a 99% yield and an anomeric α:β ration of 9:1.

Peracetylated xylose, arabinose, and ribose all exist in both pyranose and furanose forms. Peracetylated xylopyranoses 3α/3β and peracetylated xylofuranoses 4α/4β were present in a ratio of 95:5. Peracetylated arabinopyranoses 10α/10β and arabinofuranoses 11α/11β were present in a ratio of 37:13. Peracetylated pyranoses 12α/12β and peracetylated furanoses 13α/13β were present in a ratio of 87:13. This result was interesting as the pyranose form became even more prevalent post acetylation than the typically reported stereoisomerism of 75:25-80:20. This preliminary data suggests that the pyranose form of peracetylated ribose is more preferred than the furanose peracetylated ribose using this novel acetylation method. All other per-O-acetylated saccharides, 1α/1β, 8α/8β, 9α/9β and 14α/14β were isolated in high purity and the spectra were agreement with literature values. The acetylation reactions for galactose, glucose, and lactose were low yielding likely due to solubility issues in 2-MeTHF. This issue was remedied when the reaction temperature was increased to 60° C. This allowed for quantitative yields in the per-O-acetylation of 5α/5β, 6α/6β, and 7α/7β in anomeric ratios of 1:1, 3:2, and 1:1, respectively. These peracetylated saccharides and were in high purity and in agreement with literature values. It is prudent to mention the reaction time of 15 hours was not necessary to achieve complete acetylation for all nine saccharides and the one disaccharide. The C5 saccharides and one of the C6 saccharide, mannose, were fully acetylated in less than 4 hours, whereas glucose, galactose, and lactose were complete in 15 hours. Since glucose, galactose, and lactose took longer to acetylate than the rest of the sugars, all reactions were run for 15 hours to ensure each sugar was fully converted to the per-O-acetylated form. Following successful per-O-acetylation of various saccharides the method was scaled.

D-xylose and L-rhamnose monohydrate were chosen for a scale up study from the previous 1 g reaction to 10 g. D-xylose (10 g, 66.6 mmol) and L-Rhamnose monohydrate (10 g, 54.9 mmol) were per-O-acetylated following the aforementioned acetylation procedure. The 10 g synthesis (10× scale up) of both peracetylated xylose and rhamnose realized yields of >99%, Following the success of the 10 g reaction, the method was scaled another 10 times to 100 g (100× scale up). The peracetylation of D-xylose (666.1 mmol) and L-rhamnose monohydrate (525.2 mmol) realized yields of 92.7% and 95.7%, respectively. Following successful synthesis of tetraacetylated xylose with a 99% yield, and an anomeric ratio of α:β ratio of 4:1, L-rhamnose monohydrate (609.2 mmol) was per-O-acetylated and provided a 86.2% yield with an anomeric α:β ratio of 4:1. At this point, recyclability tests were performed.

The large size of P4VP beads created an opportunity to easily collect, wash, and regenerate the polymer, which could be used in subsequent acetylations. Initial recyclability screening with P4VP began using 2Me-THF and D-xylose as this saccharide showed the quickest acetylation time as previously determined by TLC (3). D-xylose (6.66 mmol) was acetylated as per the aforementioned procedure. Upon completion the P4VP was filtered and the filtrate was subjected to an aqueous work up (see supplementary information). The P4VP employed was rinsed with 3×2.5 mL/g 2-MeTHF followed by 3×2.5 mL/g MeOH. The rinsed P4VP was then subjected to regeneration (4) by first being impregnated by a 1:1 Methanol (MeOH):2-MeTHF solution at 2 mL/g. After stirring the solution for 30 minutes at RT, 150 mL of NaOH (2M) was added and the solution was stirred at RT for 3 hours. After stirring for 3 hours, the solution was filtered and rinsed with 3×2.5 mL/g of deionized water, MeOH, and 2-MeTHF. The regenerated P4VP was then added back to a reaction vessel, impregnated by 2-MeTHF, and the procedure was repeated for 10 iterations as illustrated by the equations (3) and (4) below:

(3)

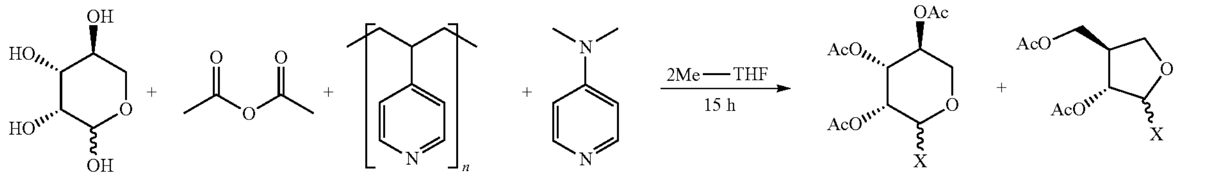

3 6-8 equiv. 6-8 equiv. 0-1 equiv.

3α: X = α-OAc
3β: X = β-OAc

4α[b]: X = α-OAc
4β[b]: X = β-OAc (4)

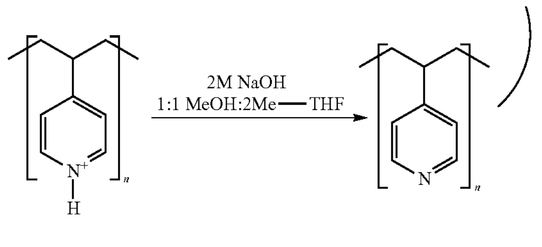

Figure 4:
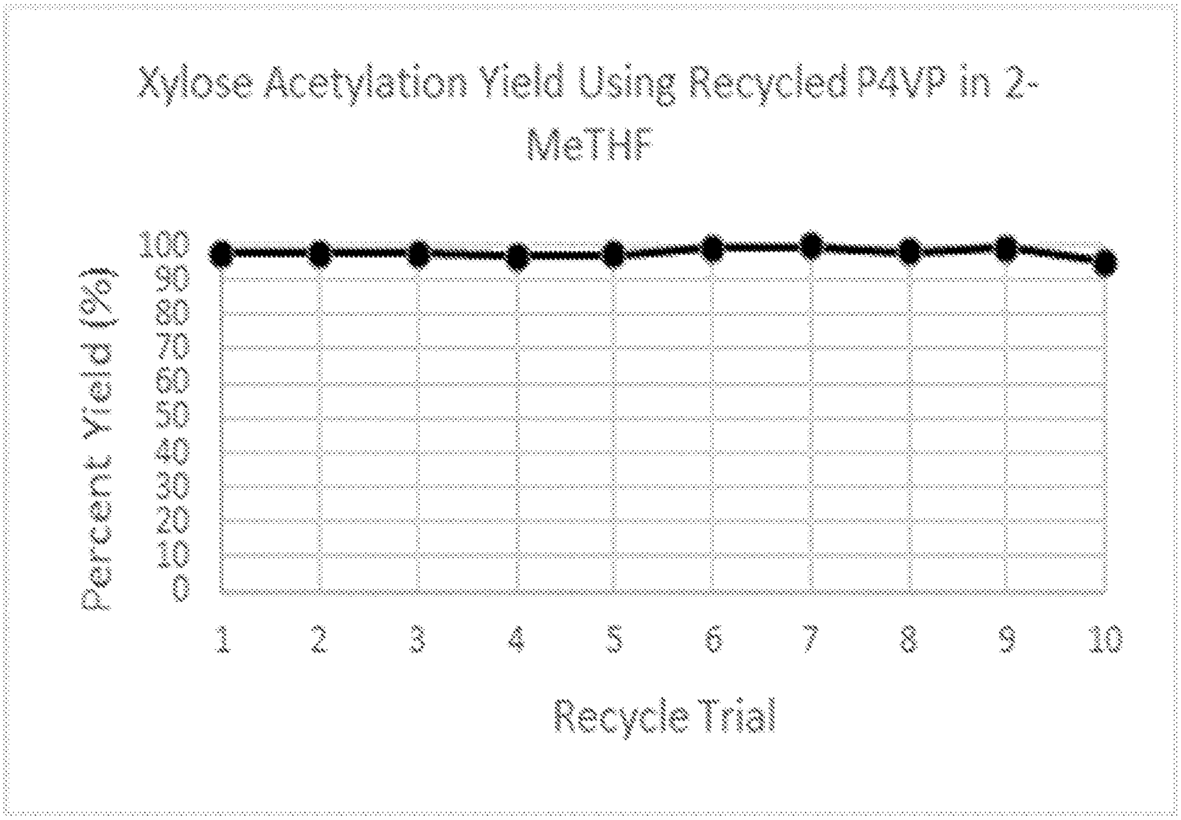
FIG. 4 is a graph showing yield percentage of Xylose Acetylation according to embodiments of the invention over 10 recycle trials.

The results are shown in of the regeneration scheme of equations (3) and (4) are shown in FIG. 4. The resulting isolated clear resins 3α/3β/4α/4β showed quantitative yields and high purity as determined by ESI MS and the anomers 3α:3β averaged a ratio of 7:3 and pyranose to furanose 3α/3β:4α/4β averaged a ratio of 37:13 as determined by $^{1}H$ NMR, respectively. This recyclability scheme (3) has also been applied to the larger 10 g and 100 g scale reactions, which have achieved quantitative yields.

Recycle Screening was Also Performed Using the Following Scheme

For each alcohol group on a carbohydrate, a molar equivalent amount plus two extra equivalent of acetic anhydride and poly(4-vinylpyridine) was used. This means for xylose and rhamnose (which contain 4 alcohol groups), 5 equivalents of acetic anhydride and poly(4-vinylpyridine) were used. For glucose and galactose, 6 equivalents of acetic anhydride and poly(4-vinylpyridine) were used. For lactose, 9 equivalents of acetic anhydride and poly(4-vinylpyridine) were used. For each reaction, 0.10 equivalents of DMAP was used as a catalyst. To start each reaction, poly(4-vinylpyridine) is dissolved in 20 mL of THF inside a round

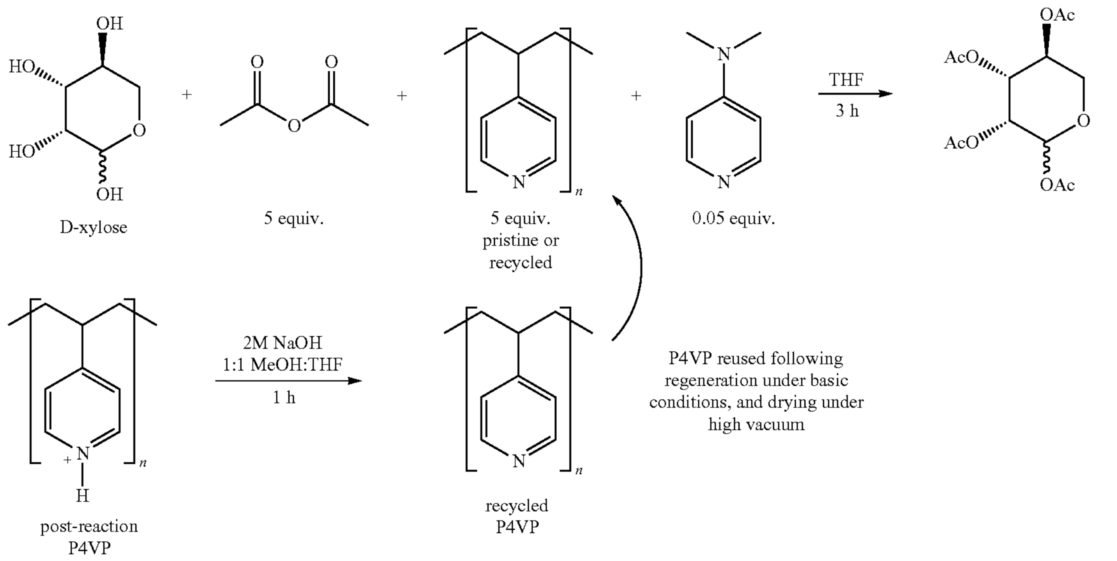

and yielding the following results

| Run Number | Isolated Yield (%) |
|---|---|
| 1 | 97.71 |
| 2 | 97.75 |
| 3 | 97.68 |
| 4 | 97.02 |
| 5 | 97.20 |
| 6 | 99.40 |
| 7 | 99.84 |
| 8 | 98.30 |
| 9 | 99.25 |
| 10 | 95.04 |

Experimentation Setup and Processes

Glassware used for all reactions were cleaned in a 1.3 M KOH in 70% isopropyl alcohol solution for 24 hours, and then oven dried. All reactions were set up with magnetic stir bars, capped, and sealed off. No heating was required for any of the reactions. The progression of each reaction was monitored using thin-layer chromatography (TLC) visualized with p-anisaldehyde dye.

Materials

Poly (4-vinylpyridine) cross linked with 2% divinyl benzene was purchased for Sigma Aldrich. All carbohydrates were purchased from Biosynth Carbosynth. Acetonitrile, Tetrahydrofuran, Toluene, and 2-Methyltetrahydrofuran was purchased from Oakwood Chemicals. Methylene chloride was purchased from Lab Alley Chemicals. Sodium Hydroxide was purchased from Oakwood Chemicals. Hydrochloric Acid was purchased from Hi Valley Chemical.

bottom flask and stirred for 15 minutes. The sugar and catalyst (DMAP) were added to the mixture. Once the sugar was dissolved, acetic anhydride was added and the reaction was sealed with a rubber septa. The reaction was allowed to stir overnight or until completion as indicated by TLC. Once completed, the P4VP was removed by filtration, and washed 3 times with 2-MeTHF (5-10 mL) for re-use. The filtrate was added to a reparatory funnel and washed 3 times with HCl (1M, 5 mL). The organic layer was then isolated, and the aqueous layer was washed 3 times with 2-MeTHF (10 mL). The organic layers were aggregated and washed with sodium bicarbonate, followed by a sodium chloride brine solution, and dried over sodium sulfate. The solvent was evaporated under reduced pressure. The remaining residue was analyzed for yield. The purity was assessed by electrospray ionization mass spectrometry, and $^{1}H$ NMR using a 300 MHz instrument.

Synthesis of 2,3,4,5-Tetra-O-acetyl-D-xylose

In a dry 100 mL Erlenmeyer flask, P4VP powder (6.0 equiv., 39.97 mmol) is combined with 2-methyltetrahydrofuran (20 mL). The mixture is continuously stirred for 10 minutes using a magnetic stir bar. Into the flask, xylose (1.0 equiv., 6.66 mmol) was added along with DMAP (0.10 equiv., 0.666 mmol). Once the sugar was fully dissolved, acetic anhydride (6.0 equiv., 39.97 mmol) was added using a syringe. The reaction was then monitored using TLC with p-anisaldehyde stain. Once the reaction was completed as indicated by TLC, the P4VP powder was removed using a filter frit and washed 3 times with 2-MeTHF (10 mL). The filtrate was placed into a separatory funnel. The product was washed three times with 25-50 mL of 1 M hydrochloric acid. The hydrochloric acid was collected and combined, and the remaining product was extracted three times with 10-15 mL of 2-MeTHF. The 2-MeTHF was combined in the funnel and washed with 30-40 mL of saturated sodium bicarbonate followed by a wash with sodium chloride brine solution. The 2-MeTHF was dried with sodium sulphate, which was removed through filtration. Once dried, the ethyl acetate was evaporated under reduced pressure leaving behind a yellow orange highly viscous oil.

All other carbohydrates, listed in Table 3, used the same acetylation protocol of 1 equivalent carbohydrate, 6 equivalents acetic anhydride and P4VP, and 0.1 equivalent DMAP.

Poly(4-vinylpyridine) Recyclability Test

Following the same synthesis of 2,3,4,5-Tetra-O-acetyl-D-xylose procedure listed above with the same equivalents, the acetylation reaction was performed. Once the reaction was completed, the polyvinyl pyridine was isolated and recycled for the next reaction. The amount of xylose and acetic anhydride were adjusted based upon the amount of poly vinyl pyridine recovered in order to keep the molar equivalents equal.

To recycle the polyvinyl pyridine power is put in 50 mL of 1:1 mixture of 2-MeTHF and 2M NaOH. The mixture is continuously stirred for 1-2 hours. After which, the mixture is filtered and washed with water followed by THF. The powder is recovered, dried, and then used in the next trial. The amount of xylose, acetic anhydride, and 4-Dimethylaminopyridine was adjusted based upon the amount of polyvinyl pyridine recovered. This recyclability test was repeated for 10 total trials to ensure reusability of polyvinyl pyridine.

Scalability Procedure

P4VP (399.65 mmol) was massed and placed in a 500 mL round bottom flask with 200 mL 2-MeTHF and stirred for 15 minutes. Xylose (66.61 mmol) was added, along with DMAP (6.66 mmol) and stirred for 15 minutes. Acetic anhydride (399.65 mmol) was added via syringe and the flask was sealed with a rubber septa and allowed to stir for 24 hours. When the reaction was completed as determined by TLC, the work up and washing steps as previously mentioned were employed, but at 10 times the volume. The collected product was tested for isolated percent yield, purity, and anomeric ratio.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

The scope of the present invention is defined by the appended claims.

What is claimed is:

1. A method of carbohydrate acetylation, comprising:
- adding a carbohydrate to a reaction vessel;
- adding poly(4-vinylpyridine) (P4VP) to the reaction vessel;
- adding a bio-derived solvent to the reaction vessel;
- adding acetic anhydride Ac2O to the reaction vessel; and
- adding a catalyst to the reaction vessel.

2. The method of claim 1, wherein one or more of the P4VP and Ac2O are added in stoichiometric amounts.

3. The method of claim 2, wherein the bio-derived solvent comprises 2-methyltetrahydrofuran.

4. The method of claim 3, wherein the bio-derived solvent is impregnated into the catalyst.

5. The method of claim 4, wherein the catalyst is 4-dimethylaminopyridine (DMAP).

6. A method of carbohydrate acetylation, comprising:
- adding a carbohydrate to a reaction vessel;
- adding poly(4-vinylpyridine) (P4VP) to the reaction vessel;
- adding a 2-methyltetrahydrofuran to the reaction vessel;
- adding acetic anhydride (Ac2O) to the reaction vessel; and
- adding 4-dimethylaminopyridine (DMAP) to the reaction vessel.

* * * * *